June 6, 1944.    C. F. WALLACE    2,350,378
METHOD AND SYSTEM OF APPARATUS FOR DETECTING AND CONTROLLING
CHANGES IN COMPOSITION OF LIQUIDS
Filed Aug. 18, 1939    6 Sheets-Sheet 1

INVENTOR
Charles F. Wallace
BY
ATTORNEYS

June 6, 1944. C. F. WALLACE 2,350,378
METHOD AND SYSTEM OF APPARATUS FOR DETECTING AND CONTROLLING
CHANGES IN COMPOSITION OF LIQUIDS
Filed Aug. 18, 1939 6 Sheets-Sheet 3

Fig. 7

INVENTOR
Charles F. Wallace
BY
ATTORNEYS

Fig. 11

- Patented June 6, 1944

2,350,378

UNITED STATES PATENT OFFICE 2,350,378

METHOD AND SYSTEM OF APPARATUS FOR DETECTING AND CONTROLLING CHANGES IN COMPOSITION OF LIQUIDS

Charles F. Wallace, Westfield, N. J., assignor to Wallace & Tiernan Products, Inc., Belleville, N. J., a corporation of New Jersey Application August 18, 1939, Serial No. 290,842

24 Claims. (Cl. 210—28)

This invention relates to methods of and apparatus for detecting changes in composition of liquids; for example the qualitative or quantitative determination of residual chlorine in water undergoing treatment such as purification.

One of the objects of the invention is to provide a method of detecting changes in composition of liquids by ascertaining or measuring the depolarization effect produced by the liquid upon an electrode exposed to the liquid.

Another object is to provide apparatus for practicing such a method or methods.

Other objects include the provision of methods of, and means for, stabilizing the operation of such methods and apparatus to the end that more reliable results are obtained.

Further objects and advantages will appear to those skilled in the art upon reading the following description of the invention and of the manner and process of making, constructing, compounding, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention, and some modifications thereof.

Referring to the drawings.

Figure 5:
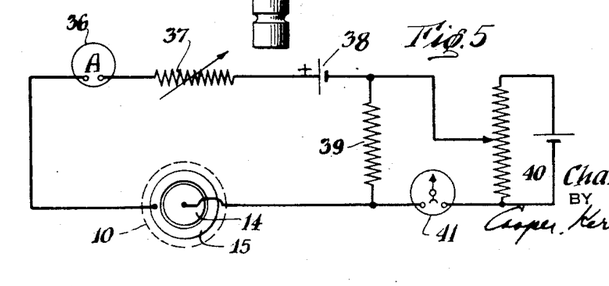
Fig. 5 is a wiring diagram illustrating a simple type of circuit embodying my invention.

A simple system embodying my invention is shown in Fig. 5, which I shall first proceed to describe. The cell 10, shown in dotted lines, has two electrodes 14, 15, shown in full lines, consisting of hard rolled gold plates mounted in a hard rubber body; the container of the cell having an inlet and outlet whereby liquid whose change in composition is to be detected may be caused to flow through the cell. The cell 10 is shown connected in a circuit including a microammeter 36, a variable resistance 37, a battery or cell 38, and a fixed resistance 39. Using a 1.5 volt cell 38, a variable resistor 37 of 5000 ohms, a fixed resistance 39 of 750 ohms, and a potentiometer 40 connected in series with a galvanometer 41 across the resistor 39, and supplying water containing residual chlorine to the cell 10, it was found that the current through the cell 10 was a function of the amount of residual chlorine in the water, rising as the residual chlorine content is increased and vice versa. The current passing through the cell 10 may be measured with the microammeter 36, or the drop of potential across the fixed resistor 39 may be ascertained by so adjusting the slide of the potentiometer that the galvanometer 41 reads zero. The polarizing current may be adjusted by the variable resistor 37 and set at any desired value with untreated water in the cell 10, and the readings of the meter 36, or the potentiometer 40, or both, correlated to the amounts or percentages of residual chlorine present in the water subsequently supplied to the cell 10.

The effect of the residual chlorine in the water supplied to the cell 10 is to effect electrode depolarization, and consequent current increase, to an extent depending upon the amount of residual chlorine in the water. The utilized effect is one of depolarization and not one of change in conductivity or resistance of the liquid in the cell. For example, the addition of salt to the water, increasing its conductivity many times, has a practically negligible effect. Change in temperature of the liquid flowing through the cell does, however, affect the readings. Therefore, if the temperature of the liquid changes substantially, recalibration must be effected unless adequate compensating means are provided. I have invented, and disclose hereinafter, satisfactory compensating means for offsetting the effects of temperature changes in the liquid.

I have found also that in many conditions of use, the operation of the system and the accuracy of detection are affected by the accumulation of deleterious substances or materials upon the electrode surfaces and I have invented a method of and means for preventing the formation of such deposits upon the electrode surfaces. These may best be understood by reference to Figs. 1 to 4, inclusive, which illustrate what I now consider to be a preferred form of cell, and which I shall now proceed to describe in sufficient detail.

Figure 1:
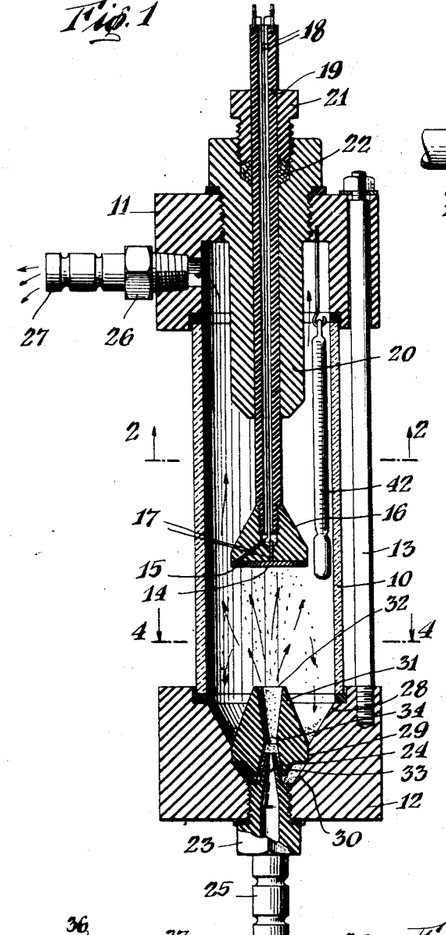
Figure 1 is an elevation, largely in section, of a novel form of cell that I prefer to employ.
Figure 2:
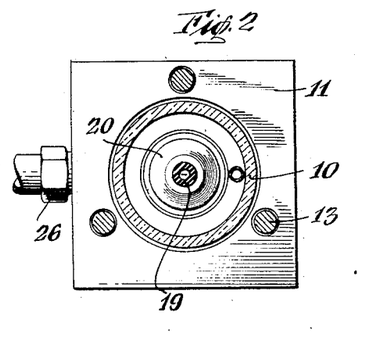
Fig. 2 is a horizontal section taken on the line 2—2 of Fig. 1.

The particular cell shown comprises a housing or container consisting of an intermediate transparent glass tube 10 clamped between end plates or blocks 11, 12, of hard rubber, with interposed live rubber gaskets, the clamping being effected by a plurality of screw-threaded metallic rods or bolts 13.

Figure 3:
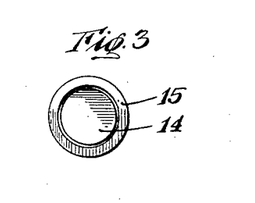
Fig. 3 is an inverted detail plan view of the exposed electrode surfaces.
Figure 4:
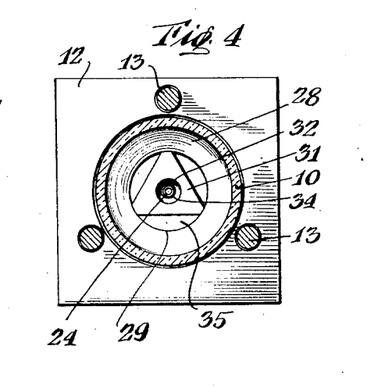
Fig. 4 is a horizontal section taken on the line 4—4 of Fig. 1.

The electrodes 14, 15, preferably of gold, are secured to the underside or base of a cone 16 of hard rubber. One of the electrodes, 14, is a circular disc and the other electrode, 15, is an annular disc whose smaller diameter is greater than the diameter of the first mentioned disc, with which it is concentric.

Electrically conductive leads 17 are each swaged to the top side of the electrodes 14, 15, and each electrically connected to a corresponding one of the leads 18 which extend through a hard rubber tube 19 which is screwed into the cone 16. The wires 18, 18 are insulated from each other except as they are electrically connected through a liquid bridging the electrodes 14, 15, or an external circuit to be connected to their upper ends.

The tube 19 extends through a sleeve 20, of hard rubber, and also a second sleeve 21, also of hard rubber, a suitable packing 22 being interposed between these two sleeves. The sleeve 20 is screw-threaded into the hard rubber end block 11 and the sleeve 21 is screw-threaded into the sleeve 20. Upon unscrewing the sleeve 21, the tube 19 may be slid vertically up or down, thereby adjusting the position of the electrodes 14, 15 in a vertical direction, and the desired position of adjustment is maintained by screwing the sleeve 21 into the sleeve 20 to cause the packing 22 to be compressed and grip the tube 19. A gasket of live rubber is interposed between the shoulder of the sleeve 20 and the upper side of the block 11. By unscrewing the sleeve 20, the electrode assembly may be removed from the container 10—11—12 for inspection or other purposes.

Liquid is introduced into the cell through the hard rubber fitting 23 which is screw-threaded into the lower end block 12, and which terminates in a nozzle 24 at its upper end and a hose-receiving connection 25 at its lower end.

Liquid leaves the cell through the hard rubber fitting 26, screw-threaded into the upper end block 11 and provided at its outer end with a hose-receiving connection 27.

When the parts are assembled, as shown, the container or housing 10—11—12 is liquid-tight, and no liquid can enter into or leave the inside of the housing except through the fittings 23, 26.

The block 12 is provided with an upwardly flaring frusto-conical opening 28, a cylindrical bore 29, and a second upwardly flaring frusto-conical opening 30. A Venturi member 31, of hard rubber, fixedly mounted in the cylindrical bore 29, is provided with a bore comprising oppositely directed frusto-conical openings 32, 33, terminating at their smaller diameters at the cylindrical opening or throat 34. The Venturi member 31 is exteriorly shaped somewhat in the form of triangular pyramids joined at their bases so as to provide openings 35 (see Fig. 4) through which material may pass or drop from the frusto-conical opening 28 into the frusto-conical opening 30.

The nozzle 24, in cooperation with the member 31 constitutes a venturi when liquid under suitable pressure or head is supplied through the fitting 23.

A suitable quantity of abrasive material is initially placed in the opening 30, or openings 28 and 30. The abrasive material consists of particles of alundum, or garnet, or emery, or sand, or other suitable abrasive or scouring materials, or combinations of the same.

When liquid under suitable pressure is supplied to the fitting 23, a jet thereof issues from the nozzle 24 and impinges upon the lower or exposed surfaces of the electrodes 14, 15.

Abrasive material, by the action of the jet in the Venturi member 31, is automatically drawn into the opening 33 from the opening 30 and passes upwardly with the jet of liquid and impinges against the surfaces of the electrodes 14, 15 which are exposed to the liquid. The liquid fills the interior of the cell and overflows or exits through the fitting 26. The abrasive material, being heavier than the liquid, is not carried out at the overflow 26, but, after impinging against the electrodes 14, 15, drops downwardly into the frusto-conical opening 28, then passes through the openings 35 (see Fig. 4) into the opening 30, whence it is again drawn into the bore of the Venturi member 31. This operation is automatically carried on continuously as long as liquid under pressure is supplied to the fitting 25 and no additional abrasive material need be added to the cell unless and until it has lost its sharpness, when it may be replenished or wholly new abrasive substituted.

The degree of scouring or scrubbing action of the abrasive upon the exposed electrode surfaces is dependent upon the dimensions of the particular cell employed, the specific gravities of the liquid supplied to the cell and of the abrasive, the character of the abrasive, the velocity of the jet of liquid discharged from the nozzle 24 through the body of liquid within the cell, etc. These factors are co-related or regulated so as to effect the removal of undesired material that would otherwise collect upon the exposed surfaces of the electrodes 14, 15, but without grinding or scouring away to any objectionable extent, the material of the electrodes themselves.

The cell shown in Figs. 1 to 4, when employed in systems such as that shown in Fig. 5 (where, as stated, the cell is shown in dotted lines at 10 and the electrodes 14, 15 are shown in full lines) renders the system stable and accurate in conditions of continued use where its operation and accuracy of indication would be otherwise greatly impaired and oft times destroyed.

The scouring or scrubbing action of the abrasive material upon the electrode surfaces has a marked effect in stabilizing the action and operation of the electrodes and the cell. Any dirt, slime, or other deleterious matter that would otherwise deposit or accumulate on one or the other, or both, of the exposed electrode surfaces, is effectively removed therefrom by the scouring or scrubbing action of the abrasive.

Figure 6:
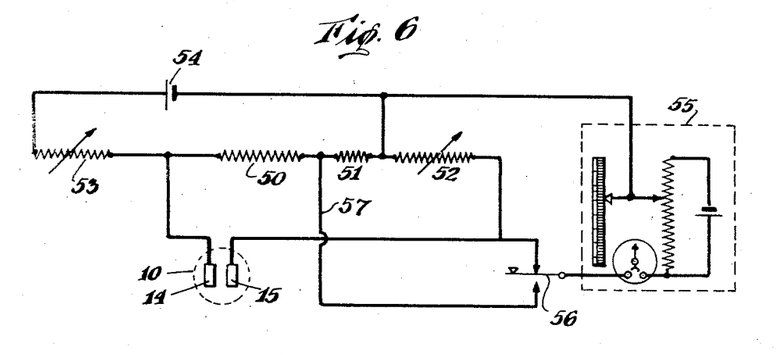
Fig. 6 is a wiring diagram illustrating an improved system embodying my invention.

As hereinbefore stated, the accuracy of detection is affected by changes in temperature of the liquid supplied to the cell 10. In Fig. 6 I have diagrammatically shown, and shall now proceed to describe, an improved system for practicing my invention wherein compensation for temperature changes of the liquid may be conveniently effected.

The cell 10 is that shown in Figs. 1 to 4, or its equivalent, having the electrodes 14, 15. A cell or battery 54, for supplying polarizing current to the cell 10, is shown connected through a variable resistance 53 across fixed resistance 50—51.

The cell 10 is shown connected through a variable resistance 52 across the fixed resistance 50—51. An indicating potentiometer 55, which may be a potentiometer type recorder, is connected across the resistance 52 when the key or switch 56 is in its normal position, as shown. In this system the current flowing through the cell 10 produces a drop of potential across the resistance 52, and this difference of potential or voltage is opposed by the differenece of potential or voltage between the slide and fixed terminal of the potentiometer 55. When this system is properly designed and adjusted, the readings of the potentiometer 55 may be correlated with the amount or percentage of free or residual chlorine in liquid supplied to and passing through the cell 10. The effective voltage of the battery 54 may be adjusted by manipulation of the variable resistance 53. This voltage may be adjusted to any desired value by first running liquid which has not been chlorinated, or whose content of residual chlorine is known, through the cell 10. For convenience in adjustment, checking, or setting, the switch or key 56 is provided with a back contact connected to a tap 57, in turn connected intermediate the resistance 50—51. Upon depressing the key 56 the potentiometer 55 is disconnected from the resistance 52 and connected across the portion 51 of the fixed resistance 50—51. For convenience in reading, in checking, the resistance of the portion 51 may be one-tenth of the total resistance 50—51. When the key 56 is released, it automatically returns to the position shown in Fig. 6.

By properly adjusting the variable resistance 52, according to the temperature of the liquid passing through the cell 10, the accuracy of indication of the instrument 55 may be maintained within practical limits.

Figure 7:
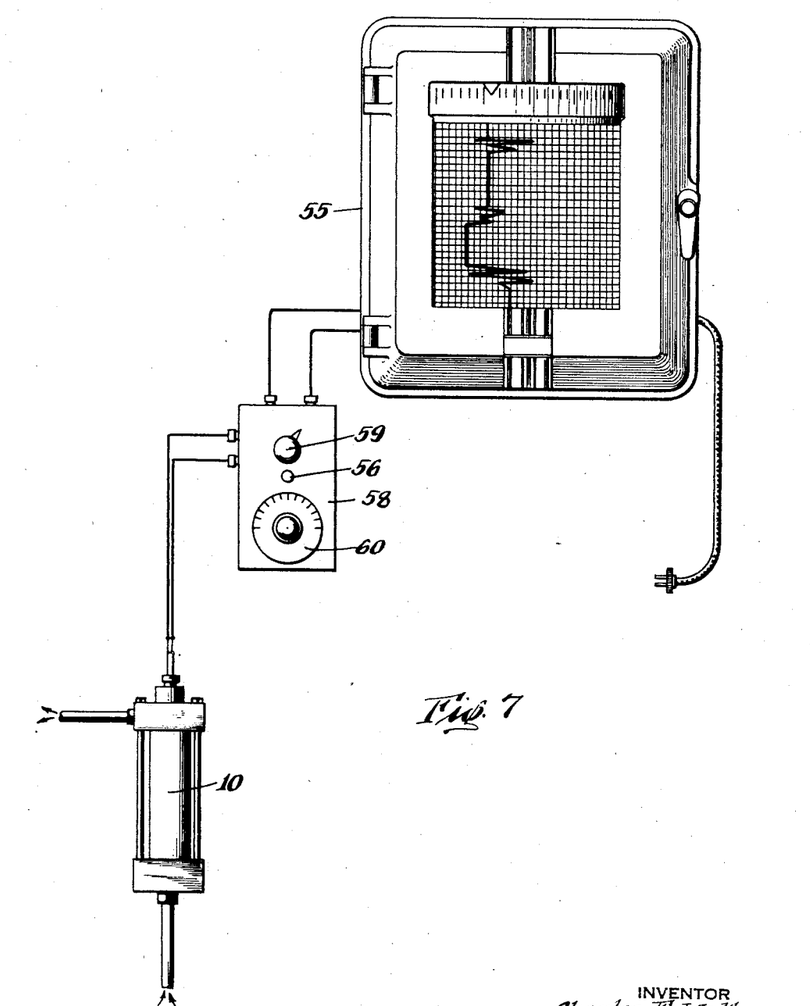
Fig. 7 is an elevation illustrating a system of apparatus utilizing the cell shown in Figs. 1 to 4 connected in a circuit such as that shown in Fig. 6.

The apparatus shown in Fig. 6 may assume the physical form and appearance shown in Fig. 7. The recording potentiometer 55 and the cell 10 will be recognized and understood by those skilled in the art without further description. The various elements 50, 51, 52, 53, 54 and 56, and some of their connections are contained in a casing or housing 58 which may be remotely located with respect to the cell 10. The casing 58 is shown provided with binding posts to one pair of which the leads or conductors from the cell 10 are connected and the other pair of which receives the leads from the instrument 55. The front or panel of the casing 58 is provided with suitable openings through which the push button of the key 56 and the spindles of the knob 59 and the dial 60 extend. The knob 59 is mechanically connected to the variable resistance 53 so as to increase or decrease the effective resistance thereof by turning the knob in one direction or the other. The dial 60 is similarly mechanically connected to the variable resistance 52. The dial 60 is so calibrated in degrees that when set in accordance with the temperature of the liquid passing through the cell 10, which may be read on the thermometer 42 provided within the cell (see Fig. 1), the variable resistance 52 will have its required effective value to compensate for temperature change and thereby insure the desired accuracy of reading at the instrument 55.

Utilizing apparatus such as that shown in Figs. 1 to 4, 6 and 7, with water containing more or less free or residual chlorine flowing through the cell 10, I have made the following observations. The electric current owing through the cell 10 was found to vary and, in most cases, in a nearly linear fashion with the amount of residual chlorine. The abrading of the exposed surfaces of the electrodes 14, 15 was found to keep them clean and thereby increased the response and stability without unduly reducing the polarization and without producing undue wear of the electrodes themselves. Changes in pH of the liquid flowing through the cell 10, such as those normally encountered in practice in the treatment of water for sterilization, produced small tolerable changes in reading of the instrument 55. Changes in temperature of the liquid passing through the cell 10 produced fairly large changes in the readings, emphasizing the importance of the adjustment or compensation afforded by the variable resistance 52 or an equivalent device. By substituting electrodes 14, 15 having different exposed areas, it was found that the area of the positive electrode has little effect, but that the current flowing through the cell 10 varies substantially directly with the exposed area of the negative electrode. As previously stated, salt added to the liquid, increasing its electrical conductivity many times, was found to have little or no effect on the electric current flowing through the cell 10. This reveals that my invention depends upon the depolarization effect as distinguished from electrical conductivity of the liquid. As thus far observed, various chemicals found in ordinary water supplies have negligible effect upon the accuracy of detection obtained. The invention is therefore well adaptable for use in connection with systems of sterilization of drinking water by chlorination.

Besides those previously indicated herein, my invention may be practiced with, and embodied in, other forms of apparatus and combinations of instrumentalities, some of which I shall proceed to describe.

Figure 8:
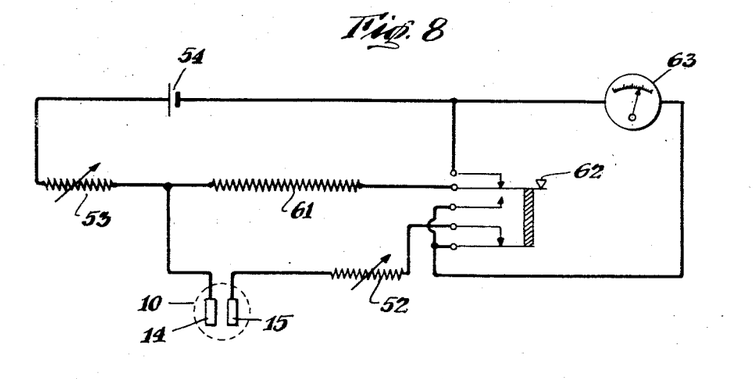
Figs. 8, 9 and 10 are wiring diagrams illustrating other forms of my invention.

In the system shown in Fig. 8, the devices 10, 14, 15, 61, 52, 53 and 54, correspond respectively to the devices 10, 14, 15, 50—51, 52, 53 and 54 shown in Fig. 6 and described above, except that the electrical connections are different. In the system shown in Fig. 8, a microammeter 63, which may be of the recording type is so calibrated as to give the desired indications such, for example, as an indication correlatable with the percentage of residual chlorine in the liquid passing through the cell 10. In the normal position of the key or switch 62, as shown, the battery 54 is connected in series with the battery voltage adjusting resistance 53 across the fixed resistance 61; and the cell 10 is connected in series with the temperature compensating resistance 52 and in series with the meter 63 across the fixed resistance 61. In this position of parts, the meter 63 is energized by the current flowing through the cell 10 which, as above explained, is a function of the depolarizing effect of the residual chlorine present in the liquid flowing through the cell 10. When the key 62 is depressed, and so long as it is held depressed, the cell 10 is disconnected and the meter 63 is connected in series with the battery 54 and the resistances 53 and 61. The functions of the test or calibration key or switch 62 are generally the same as those of the key 56 in Fig. 6. Indeed, in view of the foregoing disclosures of construction and operation of the apparatus shown in Figs. 1 to 7, and the above description of Fig. 8, the functions, construction, and law of operation of the system shown in Fig. 8 will now be understood by those skilled in the art, without further detailed description or explanation.

Figure 9:
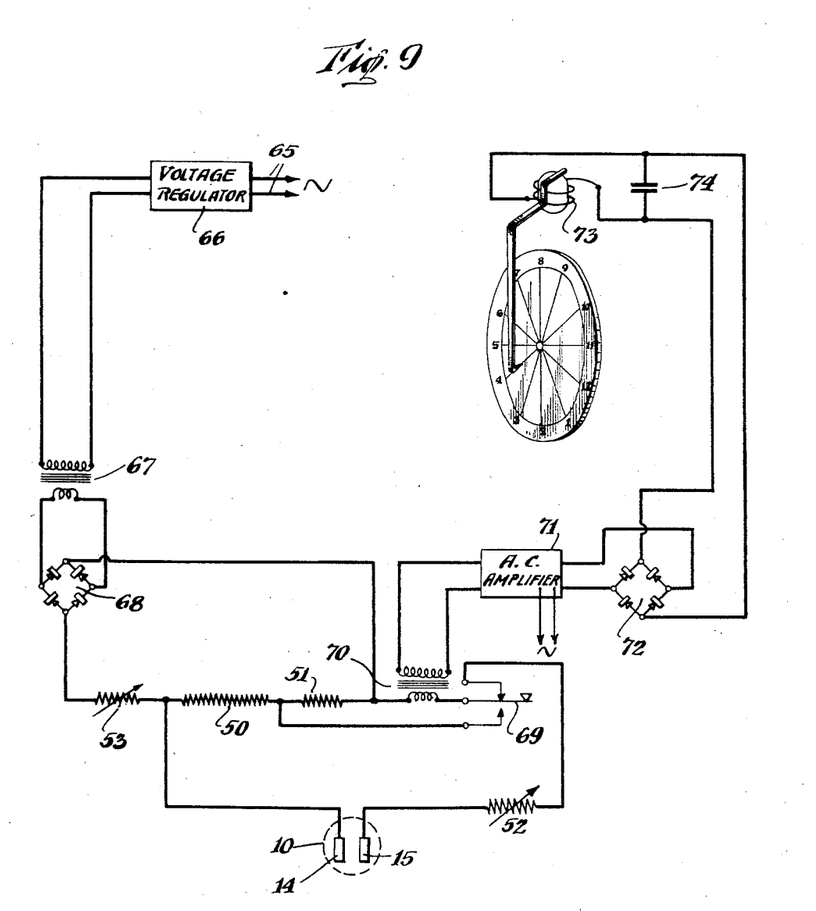
Figure 11:
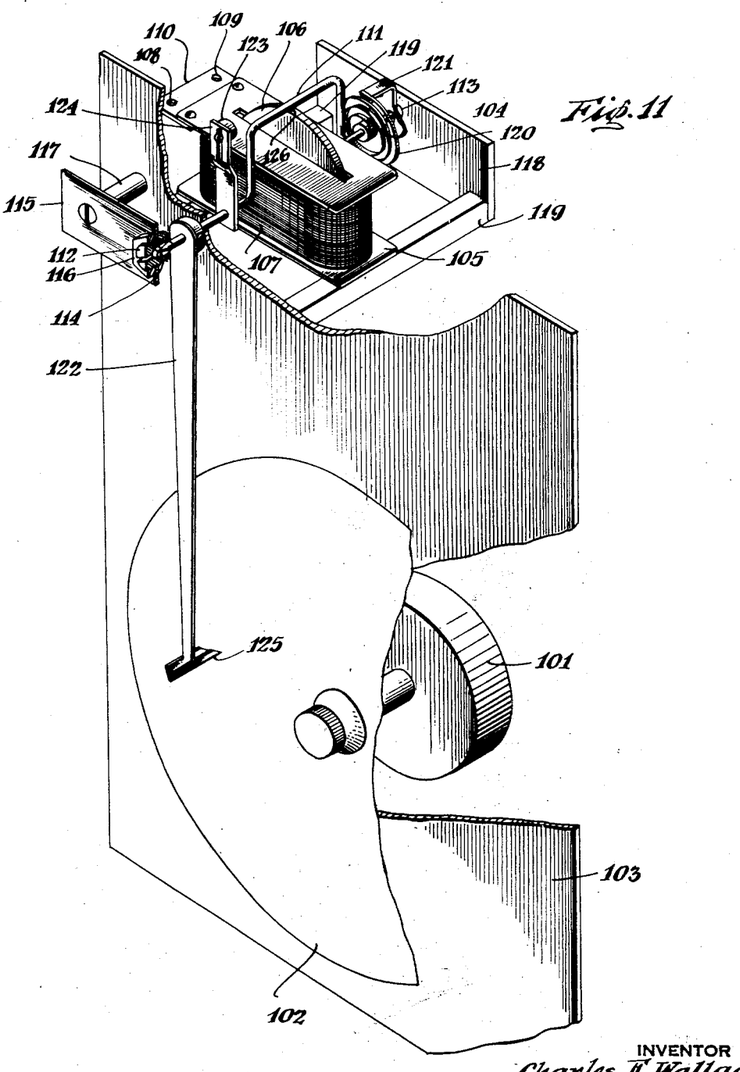
Fig. 11 is a more complete view of a galvanometer recorder used in the system shown in Fig. 9.

In Fig. 9 I have shown a system employing the cell 10 with its electrodes 14, 15, and also the resistances 50—51, 52 and 53, the functions of which will be understood in view of the foregoing descriptions of the systems shown in Figs. 6 and 8. Instead of employing a battery, such as that shown at 54 in Figs. 6 and 8, as the polarizing source, the system shown in Fig. 9 utilizes rectified A. C., i. e. unidirectional but pulsating current. As shown, the A. C. supply line 65 is connected through a suitable voltage regulator 66, so that the voltage or E. M. F. will be maintained substantially constant, to the primary of a step-down transformer 67, whose secondary is connected to the full-wave rectifier 68 which may be of the well known copper oxide type. Rectified A. C. is supplied from the rectifier 68 to the circuit 50—51, 53, etc. With the key 69 in its normal position, as shown, the primary of a transformer 70 is connected in series with the temperature compensating resistance 52 and the cell 10 across the resistance 50—51. When the key 69 is depressed, and so long as it is held depressed, the primary of the transformer 70 is disconnected from the resistance 52 and cell 10, and connected across the portion 51 of the resistance 50—51. The current flowing through the primary of the transformer 70 is rectified A. C. which has a ripple or A. C. component. This A. C. component, with suitable ratio of transformation, is supplied by the secondary of the transformer 70 to the input of an electron tube amplifier 71, which is preferably so designed as to have a linear output. The amplified current, which is an enlarged replica of the A. C. component of the current in the primary of the transformer 70, is supplied from the output of the amplifier 71 through a full wave rectifier 72 to the galvanometer recorder, designated generally as 73, having a smoothing condenser 74 connected across its coil. I shall hereinafter describe in some detail, a galvanometer which I have invented, and which is shown in Fig. 11, and which I now prefer to use at 73 in Fig. 9. The rectifier 72 may be of the copper oxide type.

If, as I prefer, the amplifier 71 is designed to have a linear output, variations in the current flowing through the cell 10 will produce a proportionate movement of the galvanometer recorder 73, even though the initial variations are quite minute and would be scarcely detectable if the galvanometer recorder were directly connected to the cell circuit.

Figure 10:
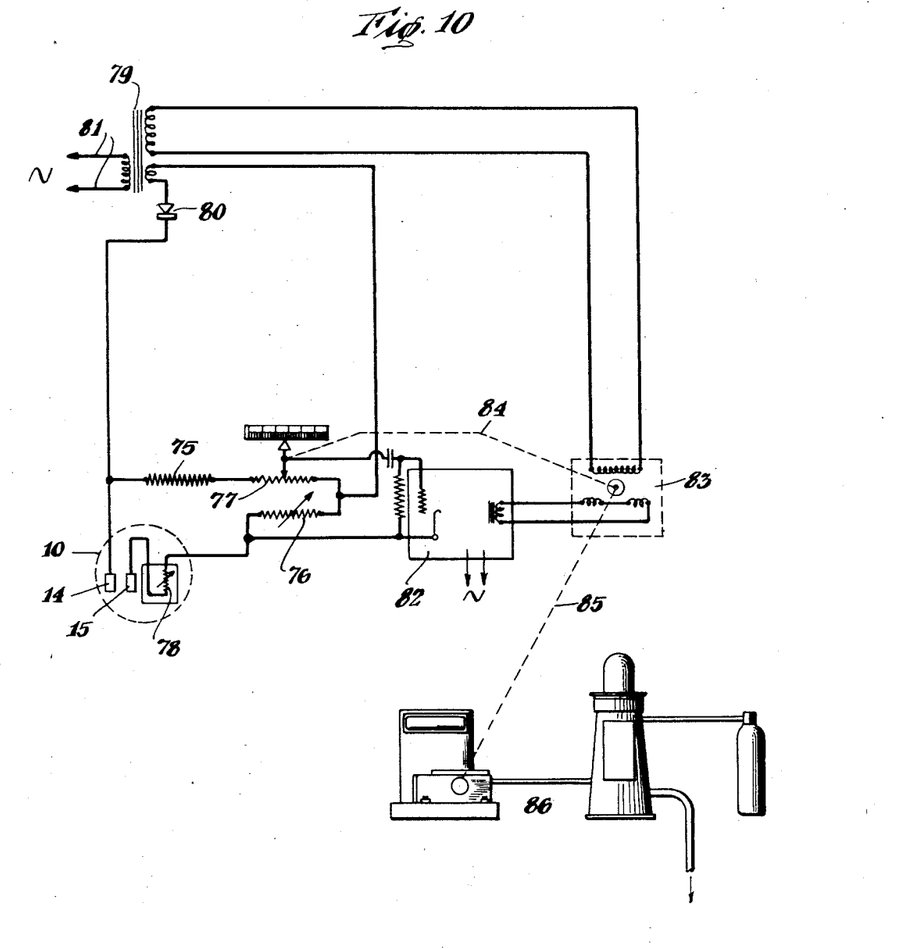

In Fig. 10, I have diagrammatically shown a system in which change in the depolarization produced by the treated liquid flowing through the cell 10 causes an unbalance in a bridge circuit and thereby causes a suitable reversible motor to run in one direction, or the other, depending upon the direction of unbalance, so to speak, and thereby through a suitable follow-up connection, to restore the balance of the bridge. The motor is shown as operating an indicator and also as controlling the chlorinating apparatus by which the liquid entering the cell 10 has been treated. With such a system, automatic control of the treatment is obtained in addition to an indication of the free chlorine present in the treated liquid.

The particular bridge shown comprises the cell 10 with its electrodes 14, 15 (shown in greater detail in Figs. 1 to 4, and described above), a fixed resistance 75, a variable resistance 76, a calibrated slide wire resistance 77, and also a variable resistance 78, hereinafter described, which may be omitted in some cases. Pulsating unidirectional current is supplied to the bridge circuit from a secondary winding of the transformer 79 through a half wave rectifier 80; the primary of the transformer 79 being connected to a suitable source 81 of the alternating current. The slide of the resistance 77 and the electrode 15 of the cell 10 are connected to the input of an alternating current amplifier 82 whose output is connected to the shading coils of a shaded pole induction motor 83. The energizing or field winding of the motor 83 is supplied with A. C. from a secondary winding of the transformer 79. A follow-up connection, indicated diagrammatically by the dotted line 84, is provided between the rotor of the motor 83 and the slide of the resistance 77. The rotor of the motor 83 is also mechanically connected, as indicated by the dotted lines 85, to the control element of the chlorinator 86.

It will be understood that in Fig. 10, unbalance of the bridge produces an E. M. F. which is proportional to the extent of the unbalance, and which is substantially in phase or 180° out of phase with the line current, depending upon the direction of unbalance. This E. M. F. is applied to the input of the amplifier and the output of the latter accordingly energizes the wound shading coils of the shaded pole motor, which has its field supplied from the line, so as to cause operation of the motor for restoration of balance in the bridge. Although other apparatus may be employed I now prefer to use amplifier-controlled shading coil motor apparatus of the character disclosed and claimed in the copending application of John R. MacKay, Serial No. 74,895, filed April 17, 1936, for Motor control apparatus, or in the corresponding British Patent No. 493,457 to Wallace & Tiernan Products, Inc., (John R. MacKay), dated December 29, 1938, for Motor control apparatus.

The apparatus is also arranged to control the operation of a chlorinator, conveniently of the vacuum type, so as to vary the feed of chlorine for maintenance of a desired condition as detected by the depolarization cell 10. To that end, a vacuum controller for a chlorinator may be operated by or under control of the shaded pole motor, when it is operated as described hereinabove. Although other chlorine feed control apparatus may be used, an advantageous form, embodying a vacuum controller operated by an amplifier-controlled motor, is shown and described in the copending application of John R. MacKay, Serial No. 244,054, filed December 5, 1938, for Proportional control systems and procedure (reference being had particularly, for example, to Figs. 13, 14 and 15 and the attendant description, of said application).

As stated, the rectifier 80 is a half wave rectifier. If a full wave rectifier were used, it would act as a frequency doubler and interfere with the desired operation of the particular motor 83 shown.

The variable resistance 78 may be so designed or constructed as to effect automatic temperature compensation, instead of effecting such compensation manually as above described. This resistance 78 is in thermal contact with the liquid flowing through the cell 10 and may be a resistance, such as a suitably encased liquid resistance, having such a temperature coefficient of resistivity as to compensate automatically against error-producing changes in the depolarization effect that would otherwise occur upon changes in temperature of the liquid flowing through the cell 10. As an alternative, the resistance 78 may assume the form of a rheostat operated by a bi-metallic thermostatic element, both suitably housed in a sealed glass envelope containing hydrogen, or other suitable fluid, so as to give good thermal conductivity with the liquid flowing through the cell 10, in which the sealed glass envelope is mounted.

With reference to Fig. 6, I have referred to an indicating potentiometer 55. While this potentiometer 55 may be a relatively simple one and provided with a galvanometer, such as that indicated at 41 in Fig. 5, I prefer in some cases to employ a potentiometer type recorder at 55 (Fig. 6). Such devices are now on the market. This potentiometer may be of the type illustrated in Fig. 122, Section 3, page 286, or described in section 3, paragraphs 284 and 285, on pages 282, 283, of the Standard Handbook for Electrical Engineers, sixth edition, published by the McGraw-Hill Company; or it may be of the general type disclosed in United States Patent No. 1,530,833, patented March 24, 1925, on application of E. A. Keeler.

Again referring to Fig. 6, upon depression of the key 56, the effective voltage of the cell 54 may be checked from time to time to insure that it has not departed from its initially set value, or to restore it to its initially set value, by adjustment of the variable resistance 53, if it has departed therefrom. In the particular arrangement shown, the voltage or drop in potential across the entire resistance 50—51 would be too great to be read directly by the instrument 55. Therefore, upon depression of the key 56, the voltage drop is read across a portion 51 of the resistance 50—51; the ratio of the resistance 51 to the total resistance 50—51 being, as stated, as 1 is to 10.

The variable resistance 52 (Fig. 6) may be employed, as above described, for effecting temperature-compensating adjustments. If desired, two separately and individually adjustable variable resistances, connected in series, may be substituted for the single variable resistance 52 in the circuit arrangement of Fig. 6, and one employed to effect temperature-compensation, as above described, and the other to effect range adjustment.

Referring to the cell 10, shown in detail in Figs. 1, 2, 3, 4 and 7, and indicated diagrammatically in Figs. 5, 6, 8, 9, and 10, the velocity of the liquid entering the cell (10) and carrying the abrasive particles, is preferably maintained substantially constant by any suitable pressure-regulating or head-regulating device so as not materially to affect the calibration of the said cell. The vertical distance of the electrodes 14, 15 above the nozzle 24 is maintained at a predetermined height so as not materially to affect the calibration of the cell.

In Fig. 9, the unidirectional component as well as the A. C. component of the current, flows through the primary of the transformer 70 in the particular arrangement shown. Suitable means may be provided, when desired, to prevent the D. C. component from passing through primary of the transformer 70, while permitting the A. C. component to pass therethrough. A simple form of such means would comprise a suitable condenser connected in series with the said primary of the transformer 70 and a suitable choke coil connected across the condenser and primary to by-pass the D. C. component.

I shall now proceed to describe a recording galvanometer which I have invented, which is shown in detail in Fig. 11, and which I prefer to use in systems such as that shown in Fig. 9. It will be understood that when the instrument shown in Fig. 11 is to be employed in the system shown in Fig. 9, the coil or winding 107 (Fig. 11) would be connected in the circuit (Fig. 9) where the coil 73 is now shown connected (Fig. 9).

The instrument shown (Fig. 11) comprises a stator 105 which is shown in the form of a spool having a central slot or rotor-receiving opening extending axially of the spool. A rotor or armature 106 is shown mounted for partial rotation or oscillation, in the stator opening, about a geometric axis which passes through the rotor and is at right angles to the axis of the spool 105 and intersects the last mentioned axis at, or substantially at, a point midway of the ends of the spool.

The axle 111, which supports the rotor 106 for oscillation about its geometric axis, is preferably offset as shown so as to lie outside the spool 105 and yet permit of the desired oscillation of the rotor 106 within its limits of travel. While the axle 111 may be supported at one of its ends for rotation or oscillation, it is preferably provided with two ends, on opposite sides of the offset portion of the axle, and each of the axle ends is suitably journaled in a corresponding one of two bearings presently to be described in greater detail. The opposite end portion of the axle 111 are co-axial with the geometric axis of oscillation of the rotor 106.

While the rotor or armature 106 may assume other forms and be made of other materials, it is shown in the shape of a circular disc of a magnetic alloy such as that known as "Alnico". These alloys are considerably lighter in weight than other materials, such as cobalt magnet steel, of which such armatures may be constructed, and the "Alnico" type of alloys provide greater magnetic retentivity, i. e. greater resistance to demagnetization, and are comparatively resistant to corrosion. However, these "Alnico" alloys, having the stated desirable properties, are comparatively brittle and practically impossible to work by machining operations other than grinding operations.

In my device, the axle 111, being offset as shown and above described, does not pass through the rotor or disc 106, but the latter is imperforate and is suitably secured to the offset portion of the axle 111 as by soldering the disc 106 to the axle at a point 126 on the periphery of the disc. Thus while the geometric axis of oscillation of the disc rotor 106 passes through the disc at its center, the axle 111 does not actually pass through the disc 106 at all; the disc being, as stated, imperforate.

By providing the construction shown, the desired alloy may be employed for the rotor 106; thereby providing a rotor which is comparatively light in weight, has high magnetic retentivity, and which may be manufactured and assembled with facility and inexpensively.

The stator or spool 105 is provided with a substantially helical multi-layer winding 107 of suitably insulated copper or other electrically conductive wire, the ends of which are electrically connected to electrical terminals 108 and 109 secured to a terminal strip 110, of insulating material, which is riveted or otherwise suitably secured to one of the ends of the spool 105.

While the geometric axis about which the rotor 106 oscillates, passes through the stator winding 107, the axle 111, being offset as shown and described, does not pass through the winding 107. Therefore, the construction described has additional advantages with respect to the construction fo the deflection-producing winding and the efficiency of operation of the instrument.

If the axle 111, instead of being offset, actually passed through the stator, it would be necessary to provide an offset stator winding, or two spaced stator windings, or otherwise to provide a clearance opening in the winding, for the axle 111. By virtue of the construction shown and described, it is possible to employ a single long winding, as shown, having a better space factor, i. e. one producing a greater magnetic flux for a given cross-sectional area, as there is more wire and less insulation or other voids in the construction.

Preferably, the spool 105 is made of copper so as to constitute, in effect, a low resistance short circuited winding providing a desired damping of undesired oscillations of the rotor 106.

The stator 105 is shown suitably secured to bars 119, in turn suitably secured to the panel 103 of the instrument.

A front bearing plate 115 is shown secured to the panel by means of studs 117, and a rear bearing plate 118 is shown secured to the bars 19.

The axle 111 may be made of steel and its opposite ends are preferably conical and journaled in the small ball bearings 112 and 113. The bearings 112 and 113 are carried by the front and rear bearing plates 115 and 118, respectively. Either or both of these bearings may be mounted so as to be adjustable in the direction of the geometric axis of the axle 111 and rotor 106. Thus, the front bearing 112 has its race externally threaded to cooperate with internal threads in the bearing plate 115; a lock nut 116 being provided to retain the bearing in any desired position to which it has been axially adjusted. The rear bearing 113 may be made similarly adjustable and settable.

In the particular instrument shown, the shaft or axle 111 has secured to one of its end portions a recording arm 122 carrying a marking pen or stylus 125 which traces a record upon the record sheet 102. While the record sheet 102 may be otherwise shaped and otherwise actuated, it is shown in the form of a circular sheet rotated by a suitably timed motor 101, such as a spring motor or clock-works, mounted on the rear of the panel 103 and having a drive shaft extending therethrough; the sheet 102 being suitably secured to the said drive shaft at its front end.

A spiral spring 120 having one of its ends secured to the axle 111 and its opposite end secured to an arm 121, in turn secured to the bearing plate 118, may be provided for biasing the rotor 106 and the indicating or recording arm 122. The magnitude of the biasing torque provided by the spring 120 may selectively be varied by setting the arm 121, which is angularly adjustable on the bearing plate 118.

An arm 124, secured to the axle 111 so as to be angularly adjustable thereon, as by means of a set screw, is provided with a weight 123 for counter-balancing the arm 122 and the pen or stylus 125. If desired, the arm 124 and its weight 123 may additionally be employed as a substitute for the biasing spring 120, or, supplemental to the spring 120, for providing the desired biasing torque for the rotor 106. To these ends, the weight 123 may be radially adjusted on the arm 124 as by the screw and slot adjustment shown, which, acting in conjunction with the angular adjustment of the arm 124, provides for either counter-balancing or biasing the structure carried by the shaft 111.

The disc rotor or armature 106 constitutes a permanent magnet. It is so permanently magnetized as to have a north pole at its periphery and a south pole also on the periphery and diametrically opposite the north pole. By so locating the permanent north and south poles in relation to the winding 107 that the lines of magnetic flux or force parallel the plane of the winding 107, when the latter is deenergized, maximum deflecting torque and a substantially uniform deflection of the pen arm 122 will be attained when the winding 107 is energized. If it is desired to spread the readings at one or the other end of the movement of the arm 122, the permanent magnet 106 may be so mounted angularly with respect to the arm 122 as to obtain an exponential relationship between the energization of the winding 107 and the deflection of the arm 122, which relationship may be substantially a function of the tangent of the angle of deflection. In any event, the deflection of the arm 122 from normal position, i. e. its position when the winding 107 is deenergized, will be dependent upon the magnitude of the direct current passing through the winding 107.

The instrument shown and described may therefore be employed as a galvanometer or other electrical indicating instrument.

Certain of my inventions disclosed herein are being claimed in my application filed of even date herewith and entitled "Electrodes and cells and methods of operation thereof," Serial No. 290,841, filed August 18, 1939.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. In a method of detecting changes in composition of a liquid containing material adapted to have depolarizing action upon an electrode polarized in said liquid, in combination, applying an external, unidirectional polarizing voltage across electrodes of which at least one is exposed to the liquid whose change in composition is to be detected and of which the other is electrically connected to said liquid to provide an electrical path through the liquid between the electrodes, for polarizing action on the exposed electrode, said polarizing voltage having a predetermined value less than 1.5 volts and adapted to produce polarization of the exposed electrode of an extent capable of detectable diminution by depolarizing influence in the liquid, and detecting the current between the electrodes produced by depolarizing action of the liquid upon the exposed electrode, as a measure of the content of the aforesaid material in the liquid.

2. The method of detecting changes in the content, in a liquid, of material therein adapted to have depolarizing action upon an electrode polarized in said liquid, which method comprises, in combination, applying a unidirectional polarizing voltage across electrodes exposed to the liquid to be tested, for polarizing action on one of the exposed electrodes, said polarizing voltage having a predetermined value less than 1.5 volts and adapted to produce polarization of the exposed electrode of an extent capable of detectable diminution by depolarizing influence in the liquid, and detecting the current between the electrodes produced by depolarizing action of the liquid upon the exposed electrode, as a measure of the content of the aforesaid material in the liquid.

3. The method of detecting changes in composition of a liquid which has been treated with chlorine for purification thereof, which method comprises, in combination, passing a polarizing current between electrodes of the same material exposed to the liquid whose change in composition is to be detected and thereby producing electrode polarization, said passage of polarizing current comprising applying across said electrodes a predetermined external unidirectional polarizing E. M. F. having a value less than 1.5 volts and adapted to produce electrode polarization capable of detectable diminution by depolarizing influence in the liquid, and detecting changes in the extent of depolarization produced by the liquid.

4. The method of detecting changes in composition of a liquid which method comprises, in combination, applying an external E. M. F. to a plurality of electrodes of which at least one is exposed to the liquid whose change in composition is to be detected and of which the other is electrically connected to the liquid to provide an electrical path through the liquid between the electrodes, and thereby polarizing the exposed electrode, said E. M. F. having a predetermined value less than 1.5 volts and being adapted to produce polarization of the exposed electrode of an extent capable of detectable diminution by depolarizing influence of the liquid, and detecting changes in current between the electrodes produced by changes in depolarization effected by the liquid, as representing changes in composition of the liquid.

5. In a method of detecting the content, in a liquid, of material therein adapted to modify the extent of polarization of an electrode polarized in said liquid, in combination, applying an external, unidirectional polarizing voltage across electrodes of which at least one is exposed to the liquid to be tested and of which the other is electrically connected to said liquid to provide an electrical path through the liquid between the electrodes, for polarizing action on the exposed electrode, said polarizing voltage having a predetermined value less than 1.5 volts and being adapted to produce polarization of said exposed electrode of an extent capable of detectable diminution by depolarizing influence of said material, converting change in the composition of the liquid into change in the depolarization produced by the liquid at said exposed electrode, converting change in said depolarization into change of current between the electrodes, and translating change of current between the electrodes as representing change in the content, in the liquid, of the aforesaid material therein.

6. In a method of detecting changes in the composition of a liquid treated with chlorine, in combination, treating a liquid with chlorine, applying an external, unidirectional polarizing voltage across electrodes of which at least one is exposed to the chlorine-treated liquid and of which the other is electrically connected to said liquid to provide an electrical path through the liquid between the electrodes, for polarizing action on the exposed electrode, said polarizing voltage having a predetermined value less than 1.5 volts and being adapted to produce electrode polarization capable of detectable diminution by depolarizing influence of chlorine in said liquid, and detecting change in current between said electrodes caused by change in depolarizing influence of chlorine on said polarized electrode, as representing change in chlorine content of the said liquid.

7. The method of detecting changes in composition of a liquid which method comprises, in combination, applying an external E. M. F. across electrodes of which at least one is exposed to the liquid and of which the other is electrically connected to said liquid to provide an electrical path through the liquid between the electrodes, for polarizing action on the exposed electrode, detecting the depolarization of the exposed electrode produced by the liquid, and abrading the exposed surface of the electrode, by projecting abrasive particles against said surface of the said exposed electrode, while its depolarization is being effected, said E. M. F. having a predetermined value less than 1.5 volts and being adapted to produce polarization of the exposed electrode of an extent capable of detectable diminution by depolarizing influence of the liquid, and detecting changes in current between the electrodes produced by changes in depolarization effected by the liquid, as representing changes in composition of the liquid.

8. The method of detecting changes in composition of a liquid which method comprises, in combination, applying an external polarizing voltage across electrodes exposed to the liquid whose change in composition is to be detected, detecting the depolarization of the polarized electrode produced by the liquid, and abrading the exposed surfaces of the electrodes, by projecting abrasive particles against said surfaces of the said electrodes, while depolarization is being effected, said external voltage applied across the electrodes having a predetermined value less than 1.5 volts and being adapted to produce polarization of the exposed electrode of an extent capable of detectable diminution by depolarizing influence of the liquid, and detecting changes in current between the electrodes produced by changes in depolarization effected by the liquid, as representing changes in composition of the liquid.

9. Apparatus for detecting changes in composition of a liquid adapted to modify polarization of an electrode polarized therein and comprising, in combination, a cell comprising a plurality of electrodes of which at least one is exposed to the liquid, said cell including means electrically connecting the other electrode with said liquid to provide an electrical path through the liquid between the electrodes, polarizing means including an external source of voltage connected across said electrodes, for polarizing action on the exposed electrode, said polarizing means including means connecting said source to said electrodes to apply across them a predetermined unidirectional E. M. F. less than 1.5 volts and adapted to produce electrode polarization capable of detectable diminution by depolarizing influence of the liquid, and means controlled by said electrodes and dependent upon the depolarizing effect of the liquid upon the exposed electrode and substantially independent of changes in electrical conductivity of the liquid for detecting changes in composition of the liquid.

10. The method of detecting changes in composition of a liquid adapted to modify polarization of an electrode polarized therein which method comprises, in combination, passing a polarizing current between electrodes of which at least one is exposed to the liquid whose change in composition is to be detected and of which the other is electrically connected to the liquid to provide an electrical path through the liquid between the electrodes, and thereby polarizing the exposed electrode, detecting the depolarization of the exposed electrode produced by the liquid, and adjusting the polarizing current upon change of temperature of the liquid to maintain the polarizing current substantially uniform.

11. The method of detecting changes in composition of a liquid adapted to modify polarization of an electrode polarized therein which method comprises, in combination, passing a polarizing current between electrodes exposed to the liquid whose change in composition is to be detected and thereby polarizing one of the exposed electrodes, detecting the depolarization produced by the liquid upon the polarized electrode, and adjusting the polarizing current upon change of temperature of the liquid to maintain the polarizing current substantially uniform.

12. The method of detecting changes in composition of a liquid adapted to modify polarization of an electrode polarized therein which method comprises, in combination, applying an external E. M. F. across electrodes of which at least one is exposed to the liquid and of which the other is electrically connected to said liquid to provide an electrical path through the liquid between the electrodes, for polarizing action on the exposed electrode, detecting the depolarization of the exposed electrode produced by the liquid, abrading the exposed surface of the electrode while its depolarization is being effected, and adjusting the polarization of the electrode upon change in depolarization produced by change in temperature of the liquid.

13. The method of detecting changes in composition of a liquid adapted to modify polarization of an electrode polarized therein which method comprises, in combination, passing a polarizing current between electrodes exposed to the liquid whose change in composition is to be detected, detecting the depolarization of the polarized electrodes produced by the liquid, abrading the exposed surfaces of the electrodes while depolarization is being effected, and adjusting the polarizing current upon change of temperature of the liquid to maintain the polarizing current substantially uniform.

14. In apparatus of the class described, in combination, a cell having electrodes of which at least one is exposed to liquid adapted to modify polarization of an electrode polarized therein whose change in composition is to be detected and of which the other is electrically connected to the liquid to provide an electrical path through the liquid between the electrodes, means including a source of E. M. F. connected to the cell for polarizing the cell, means controlled by said electrodes and dependent upon the depolarizing effect of the liquid upon the exposed electrode for detecting changes in composition of the liquid, and means for adjusting the polarizing E. M. F. supplied to the cell upon change in temperature of the liquid.

15. In apparatus of the class described, in combination, a cell having electrodes of which at least one is exposed to liquid adapted to modify polarization of an electrode polarized therein whose change in composition is to be detected and of which the other is electrically connected to the liquid to provide an electrical path through the liquid between the electrodes, means including a source of E. M. F. connected to the cell for polarizing the cell, means controlled by said electrodes and dependent upon the depolarizing effect of the liquid upon the exposed electrode for detecting changes in composition of the liquid, and means including a thermally responsive device exposed to the liquid and electrically connected to the cell for automatically compensating for changes in temperature of the liquid whereby the desired accuracy of detection is maintained.

16. In a system of apparatus of the class described, in combination, a cell having electrodes of which at least one is exposed to a liquid whose change in composition is to be detected, said cell including means electrically connecting the other electrode with said liquid to provide an electrical path through the liquid between the electrodes, means for applying polarizing voltage from an external source for polarizing action on the exposed electrode, current-responsive means connected to the cell for detecting depolarization of said exposed electrode by the liquid, and means for abrading the exposed surface of the exposed electrode during operation of the system, said voltage applying means comprising means applying across said electrodes a predetermined, unidirectional voltage less than 1.5 volts and adapted to produce electrode polarization capable of detectable diminution by depolarizing influence of the liquid, and said detecting means comprising means for measuring current through the cell, as representing said depolarization of the electrode by the liquid at said predetermined voltage.

17. In a system of apparatus of the class described, in combination, a cell having electrodes of which at least one is exposed to a liquid adapted to modify polarization of an electrode polarized therein whose change in composition is to be detected and of which the other is electrically connected to the liquid to provide an electrical path through the liquid between the electrodes, means connected to the cell for detecting depolarization of said exposed electrode by the liquid, means for abrading the exposed surface of the exposed electrode during operation of the system, and means connected to the cell for adjusting the current flowing through the cell to compensate for changes in temperature of the liquid, said system including means for applying a predetermined unidirectional, external polarizing voltage across said electrodes, and said voltage applying means comprising means applying across said electrodes a predetermined, unidirectional voltage less than 1.5 volts and adapted to produce electrode polarization capable of detectable diminution by depolarizing influence of the liquid, and said detecting means comprising means for measuring current through the cell, as representing said depolarization of the electrode by the liquid at said predetermined voltage.

18. In a system of the class described, in combination, a cell having electrodes exposed to a liquid adapted to modify polarization of an electrode polarized therein whose change in composition is to be detected, means connected to the cell for detecting depolarization of the cell by the liquid, means for abrading the exposed surfaces of the electrodes during operation of the system, and means connected to the cell for adjusting the current flowing through the cell to compensate for changes in temperature of the liquid, said system including means for applying a predetermined, unidirectional, external polarizing voltage across said electrodes.

19. In combination, a chlorinating apparatus, a cell, means including a source of E. M. F. connected to the cell for applying an external polarizing voltage to the cell, means for subjecting the cell to liquid which has been chlorinated by said chlorinating apparatus, said voltage applying means comprising means applying to the cell a voltage less than 1.5 volts and adapted to produce polarization capable of detectable diminution by chlorine in the liquid, to depolarize the cell; and means controlled by the cell and connected to the chlorinating apparatus for controlling the supply of chlorine to the liquid dependent upon the depolarization of the cell produced by the liquid, said last mentioned means including means detecting changes in current through the cell produced by changes in depolarization of the cell.

20. The method of claim 2 in which both electrodes are of the same material.

21. The method of claim 5 in which both electrodes are of the same material.

22. The apparatus of claim 9 in which both electrodes are of the same material.

23. The method of claim 1, in which the applied voltage is sufficient to provide a definite, determined current flow between the electrodes when the liquid under test is free of appreciable polarizing characteristics.

24. The method of claim 5, in which the applied voltage is sufficient to provide a definite, determined current flow between the electrodes when the liquid under test is free of appreciable polarizing characteristics.

CHARLES F. WALLACE.